United States Patent [19]

Vagi

[11] 4,114,987
[45] Sep. 19, 1978

[54] DEFLECTOR CONTROL CIRCUIT

[76] Inventor: Robert J. Vagi, 8532 Avery St., Broadview Heights, Ohio 44147

[21] Appl. No.: 664,167

[22] Filed: Mar. 5, 1976

[51] Int. Cl.² .............................................. G05D 25/00
[52] U.S. Cl. ..................................... 350/285; 358/208
[58] Field of Search .................... 350/6, 285; 358/199, 358/206, 208, 285, 293

[56] References Cited

U.S. PATENT DOCUMENTS 3,731,098  5/1973  Hunt .............................. 358/208 X Primary Examiner—F. L. Evans

[57] ABSTRACT

A medical diagnostic system and method is disclosed for producing television and laser light images of penetrative radiation patterns from a subject as converted to visible light images by an image tube. The apparatus includes a penetrative radiation source for directing radiation through a subject, an image tube for receiving that radiation and in response producing a visible non-laser light image corresponding to the pattern of such radiation impinging upon the image tube. The apparatus also includes a television camera for viewing the image tube output. A laser beam recorder receives a composite television signal from the television camera and in response produces a laser light image corresponding to the image viewed by the television camera.

The laser beam recorder produces a laser beam. The recorder includes apparatus for deflecting the beam horizontally and vertically with a mechanical scanner, in accordance with the synchronization signals of the television composite to produce an image raster with the laser light. The laser beam recorder also amplitude modulates the beam with the analog video portion of the television signal to produce a laser image. A novel control circuit controls the operation of the mechanical scanner, over an excursion, while inhibiting undesirable harmonic oscillation at the end of the excursion.

26 Claims, 9 Drawing Figures

DEFLECTOR CONTROL CIRCUIT

CROSS-REFERENCE TO RELATED APPLICATIONS

United States Patent Application S. N. 664,168 filed concurrently herewith, by Mike M. Tesic, entitled RADIATION IMAGING APPARATUS AND METHOD EMPLOYING SPATIALLY COHERENT LIGHT ENERGY.

BACKGROUND OF THE INVENTION

1. Field of the Invention

This invention relates to a medical diagnostic system and method for radiation imaging and particularly to a novel control circuit for a mechanical scanner used in the system.

2. Description of the Prior Art

The utility of directing penetrative radiation, such as X-rays, through a subject and recording the pattern of this energy emerging from the subject is well known. In the field of medical diagnosis, for example, observation of the pattern of X-rays passing through a subject frequently yields valuable information as to the condition of the subject.

In certain medical applications, radiopaque material is injected into or ingested by the subject and X-rays are then directed through the subject. The accumulation or movement of such material in or about various portions of the body can be observed by noting the pattern of X-rays emerging from the body.

One X-ray imaging system includes apparatus for producing both film camera photographs and apparently continuous television images of a subject, derived from patterns of penetrative radiation from the subject. Such a system includes a radiation source for directing radiation through the subject, and an image tube for receiving the radiation after passage through the subject and converting the radiation to a visible light image at an output, the visible image representing a pattern of the received radiation. The apparatus further includes a film camera for producing photographs of the visible output image and a television imaging system for producing a substantially continuous image representing the radiation pattern from the subject. An optical diverter apparatus is also provided for the selective transmission of the output image from the image tube to one of the television imaging system and the film camera. A collimating lens is interposed between the image tube output and the diverter, and a focusing lens is located between the diverter and the television imaging system.

In this prior system the film camera images have resolution superior to that of the television images. Thus, in regions of particular interest, when higher resolution was desired, the examiner relied on the higher resolution images produced by the film camera.

While this prior system performs well in many applications, there has still been a desire for improved performance. There has been a continuing desire for even better resolution. The necessiety for mounting the film camera, television imaging system components and diverter at predetermined locations to receive the output of the image tube makes the examining apparatus somewhat more cumbersome than is desired. Since the apparatus must be positioned and/or moved among various locations relative to the subject, this bulk of the system can cause inconvenience.

The nonlaser light used to produce the image in the prior system exhibits undesirable diffusion when optically processed, limiting system resolution. Noise in the television signal also impairs resolution. Optical losses occur because the collimating and focusing lenses must be separated by the diverter. The image power from the image tube is insufficient to expose rapidly enough newer types of fine grain film whose use can improve resolution.

Some types of light energy used to form images (e.g., laser light) can be processed to enhance the quality and resolution of these images. For example, a technique known as "apodization" can be used to enhance contrast, or the "modulation transfer function" of some images, or to emphasize either coarse or fine detail. The spatially incoherent light image from the image tube output, however, is not susceptible of enhancement of resolution or utility in this fashion. Techniques of apodization are explained in an article in the *Journal of the Optical Society of America,* September, 1973, Vol. 63, pp. 1071 et. seq.

The visible light from the image tube output is inherently incapable of fully retaining its resolution when optically processed. This is due in part to a phenomenon called "veiling glare." The polychromatic visible light, containing rays of differing wave length and phase, and which respond differently in refraction, is scattered when it traverses an interface between two media having differing indices of refraction, and is reflected within optical elements, such as lenses, to emerge at points distant from their expected optical paths.

The prior art system cannot take advantage of easy processability which is available in some recently-developed types of film. These films include dry-process silvered and nonsilvered (vesicular) film. The reason these new films are not applicable with the prior art system is that the output of the image tube does not possess sufficient image power (brightness) to expose these types of film as rapidly as necessary for fast exposures. The rapid exposures are needed for stopping action and for producing apparently continuous cinematic images. These objectives often require 105 millimeter exposures in as short as 1/30th of a second.

The image power needed to expose ordinary wet process, and dry process films (silvered and nonsilvered) varies greatly. For example, to expose an image 105 millimeters in diameter in 1/30th of a second on a typical wet process, fine grain film requires 1-2 milliwatts of power in the light falling on the film. By contrast, to make the same exposure on dry process silvered film requires about 30 milliwatts, while dry process nonsilvered film requires about 300-500 milliwatts. Power in the neighborhood of 30 milliwatts or greater cannot be obtained from the output phosphor light image of any presently known image tube.

In the prior system, the film camera, television camera and diverter must be mechanically coupled with respect to the image tube to maintain the film camera and television imaging components optically couplable to the image tube output. This agglomeration of equipment constitutes a bulky and heavy unit. Since the unit sometimes must be moved among various positions with respect to a subject, the unit requires complex and expensive support and counterweighting equipment for accomplishing this motion. Such equipment requires unduly large examining room space. The presence of such a large unit can add to the anxiety patients often feel during examination.

The prior system lacks flexibility in the presentation of its higher resolution film camera images. To view them, an attendant or physician must enter the examination room, remove the film from the camera and process it, a time-consuming procedure.

It is a primary object of this invention to provide a system and method for producing high energy and resolution medical diagnostic images from penetrative radiation patterns.

SUMMARY OF THE INVENTION

A system embodying this invention overcomes the disadvantages of the prior art by providing a system and method for producing light images corresponding to penetrative radiation patterns from a subject by use of a source of spatially coherent, substantially monochromatic light. These images have better resolution and higher image power than film camera images obtainable with the prior art systems and methods. This improved performance is accomplished with a system whose bulk and mass is substantially reduced over the previous equipment. Flexibility of use of the images is also improved.

The system produces electrical television signals representing patterns of penetrative radiation from the subject, and operate upon these patterns to produce corresponding laser light images.

The system embodying this invention includes a penetrative radiation source for directing radiation through the subject and an image intensifier tube for receiving the patterns of radiation emerging from the subject and converting them to a visible nonlaser light image at an output phosphor. A television camera views the output phosphor and produces a composite electrical television signal representing the viewed output phosphor image. The composite television signal is directed to a video recorder, which converts the television signal to a laser light image corresponding to the output image viewed by the television camera.

The television signal produced by the television camera includes a video signal having an amplitude function representing the brightness distribution of the viewed output phosphor image, and horizontal and vertical synchronization signals.

The video recorder includes a source producing a beam of spatially coherent, substantially monochromatic (laser) light and apparatus responsive to the synchronization signals for deflecting the laser beam in a pattern corresponding to an image raster. The vertical component of this deflection is effected by a galvanometer scanner which is responsive to the vertical synchronization drive signals of the television composite signal to scan the laser beam in a vertical direction in synchronization with the field scanning rate of the television camera.

The laser beam recorder amplitude modulates the laser beam in accordance with the video portion of the television signals, so that the instantaneous brightness of the laser beam, deflected in the raster, describes the brightness distribution represented by the video signals.

The galvanometer scanner includes a low mass mirror movable in response to electrical current controlled by a control circuit operating in synchronism with the vertical synchronization drive signals from the television camera. The control circuit includes circuitry for producing a repeating ramp function to cause the mirror to repeatedly scan in a substantially uniform motion. This circuit also operates during the video retract time, between each scan, to cause the mirror to retrace rapidly without undue harmonic oscillation or "bounce" when it reaches the end of its retrace excursion and begins its next vertical scanning cycle.

The galvanometer control circuit compensates for the natural, but undesirable, harmonic oscillations of the mirror which occur at the end of its retrace excursion by abruptly varying the vertical retrace signal during the retrace traversal of the mirror. This variation is timed such that it sets up a harmonic oscillation in the mirror movement which is subsequently used to cancel out the oscillations established at the end of the retrace excursion. The characteristics of the abrupt variation are chosen to cause the oscillations set up by the variation to have equal amplitude and opposite phase to these occurring at the end of retrace.

The existence of the concurrently filed application Ser. No. 664,168, of Mike M. Tesic and the similarity of its disclosure to that of the present application came about because of distinctions in the inventorship of some of the inventive features of the system described herein. The general principles resulting in the application of the laser beam recorder in the present system were invented by one inventor and are claimed in the referenced Tesic application. The particular circuitry for controlling the operation of the galvanometer scanner was invented by the present inventor and is described and claimed in this application.

A specific embodiment of the system and method of this application is set forth in the description below, with reference to the described drawings.

DESCRIPTION OF THE PREFERRED EMBODIMENT

Figure 1:
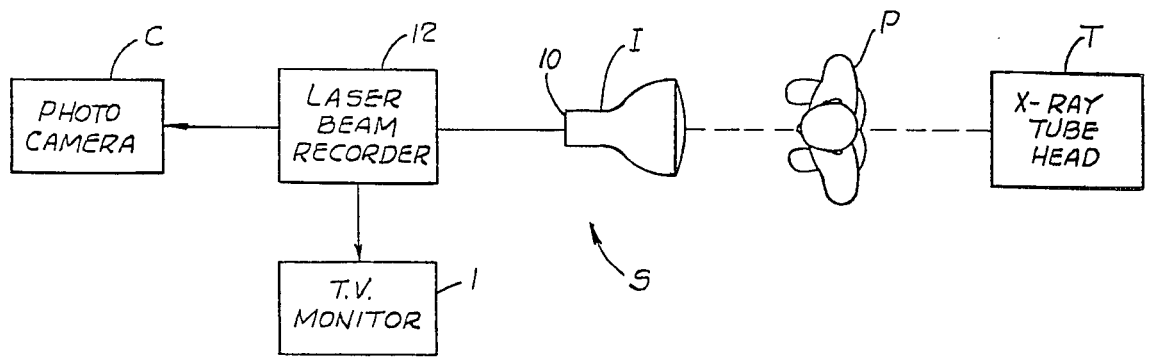
FIG. 1 is a diagrammatic drawing showing a system incorporating the apparatus of this invention.

FIG. 1 shows a radiation imaging system S constructed in accordance with this invention. The system S produces photographic and television images of patterns of penetrative radiation passing through the body of a patient P. The penetrative radiation is preferably X-rays, but may be another form of radiation, such as gamma rays or the like.

In operation of the system S an X-ray tubehead T directs X-rays (shown by the dotted line in FIG. 1) through the body of the patient P. The X-rays emerge from the body of the patient P in patterns which indicate the condition of the tissue in his body through which the X-rays pass. An intensifier tube I converts the patterns of X-rays emerging from the patient's body to a visible light image corresponding to those patterns at an output phosphor 10.

A laser beam recorder 12 receives the visible light image by way of focusing and collimating lenses 11 and 11a, and converts the visible light image at the output phosphor 10 into a pattern of substantially monochromatic (laser) light energy corresponding to the image at the phosphor 10. A photographic film camera C is provided to receive and record the laser light images produced by the laser beam recorder 12.

The system S also produces a television image corresponding to the light image at the phosphor 14 on a television monitor M.

The X-ray tubehead T, and the intensifier tube I, are of known construction, and can be provided by those of ordinary skill.

The X-ray tubehead T includes an X-ray tube of known design for directing X-rays through the patient P in response to the application of electrical current and voltage thereto. The tubehead also includes tube cooling apparatus and electrical terminals for actuating the tube. Control circuitry (not shown) is provided which is connected to the tubehead T for causing the tube to emit X-radiation preferably pulsed at a rate of 1–6 pulses per second, synchronized as explained below.

The image tube includes an input photocathode for emitting electrons in response to impingement of X-rays thereon, in a pattern corresponding to that of the impinging radiation. Electrical apparatus accelerates and focuses the electrons onto the output phosphor 10. The output phosphor 10 produces a visible light image corresponding to the pattern of the incident electrons. Preferably, the output phosphor is made of a single crystalline cesium iodide material.

Figure 2:
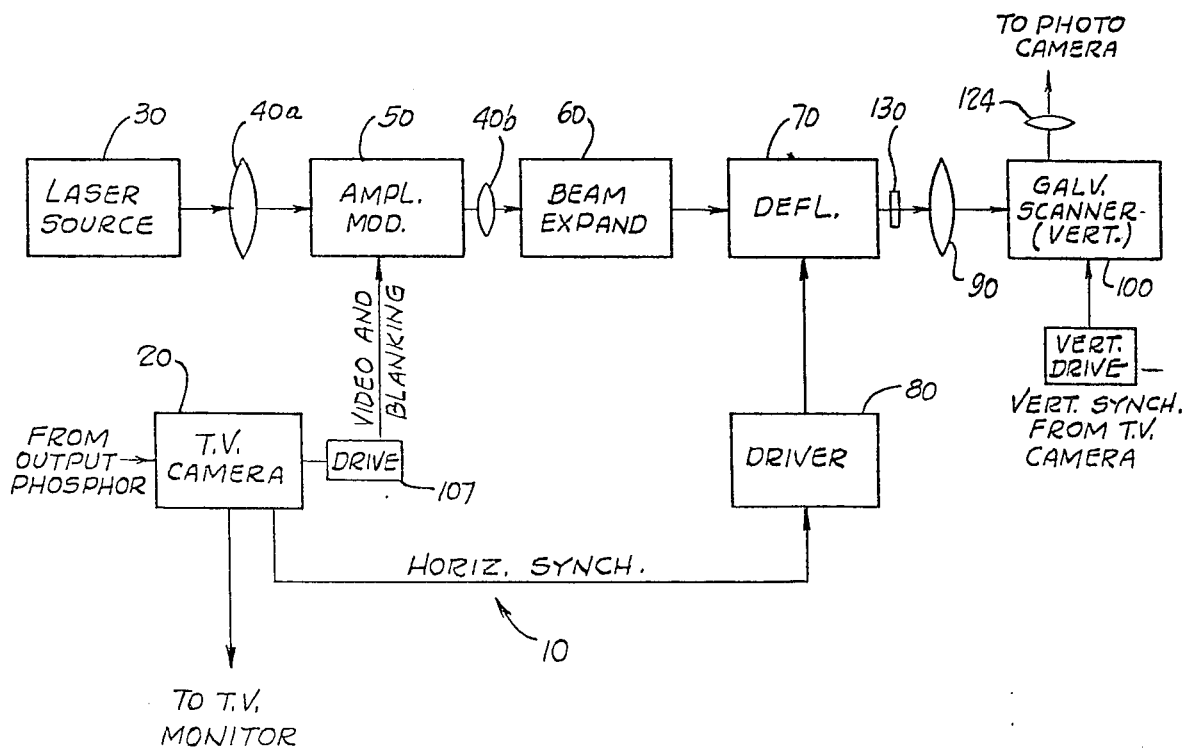
FIG. 2 is a block diagram of a portion of the apparatus of this invention.

FIG. 2 is a block diagram illustrating the laser beam recorder 12. The laser beam recorder produces a laser beam output image corresponding to the image at the output phosphor 10.

The recorder 12 views the image at the output phosphor 10 with a television camera 20 producing a composite television signal, including video, and horizontal and vertical synchronization signals. A laser beam from a source 30 is amplitude modulated with the television video signals, by an acousto-optical modulator 50 to impress video information on the beam to represent the brightness pattern of the viewed image. The amplitude modulated laser beam is also horizontally scanned by an acousto-optical deflector 70 (driven by the television horizontal scanning signals by way of driven circuitry 80) and vertically deflected by a mechanical galvanometer scanner 100 in responde to 16 vertical synchronization signals from the camera 20 to create a raster format for the brightness modulated laser beam to produce the laser image.

The television camera 20 is suitably embodied by any of a number of known types of television cameras, such as a vidicon, an isocon or a plumbicon. The television camera 20 is positioned to view the image at the output phosphor 10 of the image tube I. In known fashion, the television camera scans the viewed image line by line and produces a television composite signal. The television composite signal includes video signals varying in amplitude corresponding to the lighter and darker regions of the light image viewed, along with horizontal and vertical synchronization signals and blanking signals, for controlling the scanning of the viewed image by the camera and the deflection of the laser beam in the raster format, as explained below. The television camera 20 preferably has a field scan rate of operates at 30 frames per second continuously in an interleaved or noninterleaved mode, with a 945 line-per-field scan.

The laser source 30 produces an intense circular beam of spatially coherent substantially monochromatic light approximately one to two millimeters in diameter. This coherent light is processed to provide the laser light image corresponding to the light image at the output phosphor 14. The laser source 30 produces a beam having power in excess of 5 milliwatts, depending on the film sensitivity. In some applications, a laser beam having up to 500 milliwatts of power or more is preferred.

The laser source 30 is preferably a gas laser suitably embodied by a helium-cadmium type (producing a blue beam), a helium-neon type, (red beam), or an Argon ion laser (green beam). For maximum resolution of the laser light image, the laser source should be operated in the TEM00 mode. A suitable laser source is a Model LSR-514 laser manufactured by C. W. Radiation Company of Mountain View, Calif. This laser produces a beam of coherent light having a diameter of approximately 1.2 millimeters, and a wavelength of about 633 nanometers.

It is anticipated that semiconductor junction lasers will also be applicable as suitable laser source for the application of this invention, when adequate commercial examples of such devices become available. These devices can be amplitude modulated by current changes and eliminate the separate amplitude modulator apparatus required in this embodiment.

A focusing lens assembly 40a is interposed in the laser beam emanating from the source 30, and includes an F lens having a focal length of 100 millimeters. The focusing assembly 40 focuses the laser beam to a predetermined diameter (about 2 millimeters) for impingement on the input of the acousto-optical amplitude modulator 50.

The amplitude modulator 50 receives the focused laser beam, and amplitude modulates the laser beam in accordance with the value of the video (brightness) and blanking signals from the television camera 20, which are also input to the amplitude modulator 50.

The amplitude modulator 50 is a known type of acousto-optical or "Bragg angle" modulator. This device (FIG. 3) includes a crystal 103 through which the laser beam is directed, and an electromechanical transducer 105 connected to the crystal for inducing acoustical waves in the crystal. The device also includes an electronic package 107 for driving the transducer in accordance with a predetermined mode of operation.

The transducer 105, driven by the electronic package 107, produces substantially planar acoustical (mechanical) traveling waves 108 in the crystal 103 which move longitudinally through the crystal. These waves are manifested as alternate compressions and rarefactions in the crystal material. The waves possess a wavelength L, which is a function of the frequency of operation of the transducer 105.

Figures 3, 4:
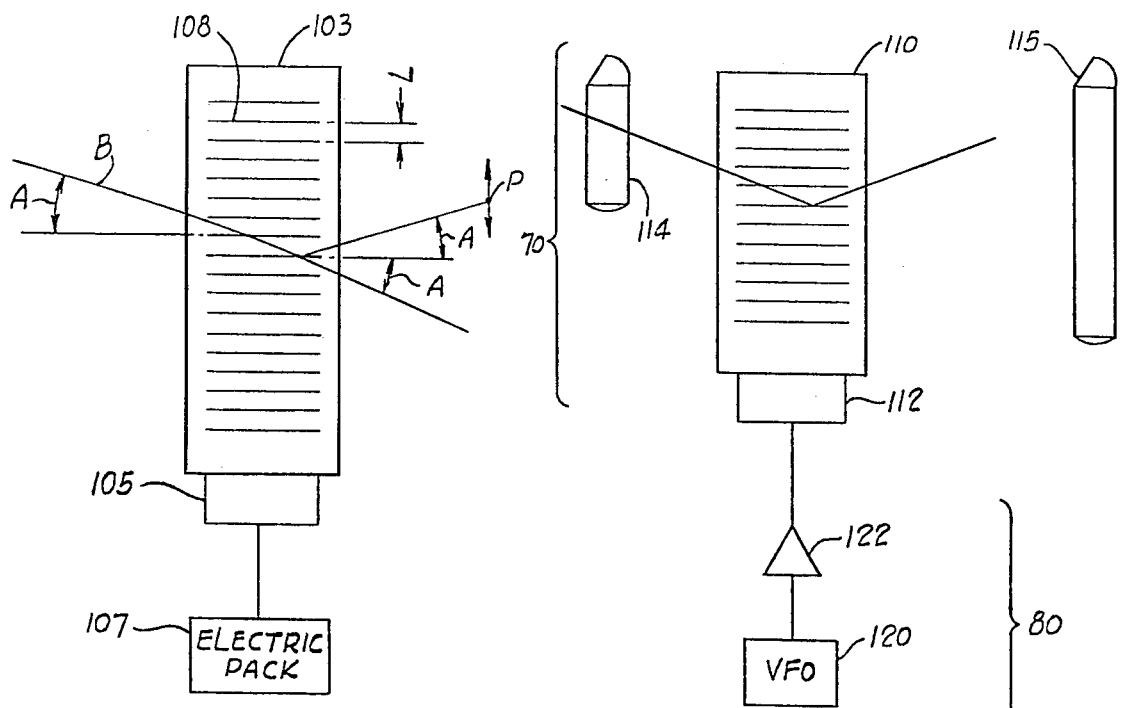
FIG. 3 is a block diagram of a portion of the apparatus shown in FIG. 2.
FIG. 4 is a block diagram of another portion of the apparatus shown in FIG. 2.

As shown in FIG. 3, the laser beam B having wavelength W is propagated into the crystal at an angle A to the acoustical waves.

In accordance with known phenomena, when the laser beam is incident to the acoustical wave fronts at an angle A approximately equal to the "Bragg angle" (about 1 degree in this case) a portion of the laser energy is diffracted toward a point P along a path forming an angle to the undiffracted beam equal to twice the Bragg angle. The Bragg angle A is defined by the relation:

sin A = ± W/2L.

It is thus apparent that the diffraction angle is a function of the wavelength L of the acoustical waves and of the frequency of those waves.

An acoustic-optical device such as shown in FIG. 3 can be used to scan, or amplitude modulate the laser beam impinging on the crystal. To scan the beam, the frequency of the transducer is modulated to scan repeatedly through a given frequency in a sawtooth function. This causes the point P to repeatedly scan in the directions of the arrows in FIG. 3. To amplitude modulate the laser beam the amplitude of mechanical action of the transducer is modulated. This varies the density gradients in the crystal defining the acoustical waves, which in turn varies the fraction of the laser energy input to the crystal which is diffracted, the differation angle remaining the same.

The modulator 50 is operated in the latter mode, i.e., the amplitude of the transducer action is modulated, to amplitude modulate the laser beam.

The electronic package includes an oscillator driver and associated circuitry of known type for propagating a 220 megahertz (MHz) acoustical wave as a carrier through the crystal. The electronic package also includes circuitry for receiving the video signals from the television camera 20 and amplitude modulating the 220 MHz carrier as a function of the variations of those video signals. The laser beam enters the crystal at approximately the Bragg angle. This technique therefore causes the amplitude modulation of the laser energy emerging from the crystal in accordance with the amplitude values of the video signal, corresponding to the brightness distribution of the viewed image.

The crystal itself is suitably embodied by a lead molybdate or a lithium niobate crystal. The components of the acousto-optical amplitude modulator 50 are commercially available, embodied by a Model M30M device made by Societe de Realisations Optiques, Boulogne-sur-Seine, France, (S.O.R.O.). The electronic package is suitably embodied by a S.O.R.O. Model.

The amplitude modulated laser beam from the modulator 50 is directed through a beam-shaping optics assembly 60. The beam-shaping optics assembly 60 expands the circular beam uniformly to a beam of approximately 25 millimeters in diameter, at the input to the deflector 70. Improved resolution thereby comes about, since this 25 millimeter beam is large enough to fill the entire laser input of the deflector 70, which condition is known in the art as providing maximum resoltuion for the deflected beam. The beam-shaping optical assembly 60 is suitably embodied by a Spectra Physics Model 338 beam expander, manufactured by the Spectra Physics Corporation in Mountain View, Calif.

The expanded and amplitude modulated laser beam is directed by the beam-shaping optical assembly 60 to the acousto-optical deflector 70. The acousto-optical deflector 70 is operated by a driver circuit 80. The deflector 70 and the driver 80 cooperate to deflect the amplitude modulated laser beam in a horizontal direction in accordance with the scanning sequence defined by the horizontal synchronization signals generated by the television camera 20. The purpose of this horizontal deflection is to enable the laser beam, already amplitude modulated by the video signals with brightness information, to deflect horizontally in accordance with the scanning of the television camera 20 so that the modulated and horizontally deflected laser beam can be further processed to create a complete laser image corresponding to the image viewed by the television camera 20.

The deflector 70 (FIG. 4) includes an acousto-optical crystal 110 having rectangular input and output profiles (windows) having dimensions of about 1 millimeter by 25 millimeters, and a transducer 112 connected to the crystal for propagating acoustical waves therethrough. The circular laser beam, having a cross-sectional diameter of about 25 millimeters is directed onto the input profile of the crystal, at approximately the Bragg angle (about 1 degree). The deflector also includes input and output cylindrical lenses 114, 115. The lens 114 anamorphically (in one direction only) contracts the laser beam to transform it to a shape roughly congruent with that of the input profile, so that substantially the entire beam is directed through the input profile. After passing through the crystal, the beam is anamorphically expanded by the lens 115 to restore it to its circular cross-section.

The deflector 70 is suitably embodied by a "Deflector, Acousto-optic," Model 2250K, manufactured by S.O.R.O.

This acousto-optical deflector is operated in the scanning mode, by scanning the transducer frequency, as explained above. The driver circuitry 80 includes a variable frequency oscillator (VFO) 120, and associated amplification circuitry 122 connected between the transducer and the VFO for driving the transducer to propagate acoustical waves through the crystal at a frequency which is a linear function of the value of the input to the variable frequency oscillator.

The variable frequency oscillator is driven by the horizontal synchronization signal from the television camera 20. The horizontal synchronization signal is in the form of a sawtooth wave having a uniform period. The sawtooth wave is synchronized with the horizontal line-by-line scanning of the television camera 20 in viewing the image at the output phosphor 10.

The driver circuitry 80 responds to the sawtooth horizontal wave from the television camera 20 to induce the transducer to generate acoustical waves in the crystal repeatedly scanning in frequency ranging between 150 and about 300 Megahertz (MHz). The frequency is 150 MHz at the lowest value of the sawtooth wave and 300 MHz at the highest value of the sawtooth wave, and varies linearly for the intermediate sawtooth wave values.

The horizontal sawtooth wave thus frequency modulates the signal produced by the driver circuitry 80, and consequently modulates the frequency of the acoustical waves in the crystal of the deflector 70. In response to the frequency modulation, the amplitude modulated laser beam is deflected in a horizontal repetitive pattern corresponding to the horizontal scanning of the television camera 20.

The amplitude modulated and horizontally deflected laser beam from the deflector 70 is then passed through a beam-reducing lens assembly 90 to reduce the beam to a relatively small diameter. This beam-reducing assembly 90 is suitably embodied by an f4.5 lens of 200 millimeters focal length and an f2, 16 millimeter focal length lens; the separation of the two lenses being adjustable to focus the beam at a desired distance.

The reduced beam is vertically scanned by the mechanical galvanometer scanner 100. The scanner 100 is located such that the reduced beam is about 2-3 mm. in diameter when it reaches the scanner. Vertical scanning of the amplitude modulated and horizontally scanned laser beam causes the beam, when projected onto a reflective or light sensitive medium, to produce thereon a complete laser light image corresponding to the image viewed by the television camera 20.

The scanner 100 is connected to respond to the television camera 200 to repeatedly or singly vertically scan the beam downwardly over a predetermined path at a rate of repetition synchronized with the occurrence of the vertical retrace synchronization signals from the television camera 20.

The scanner 100 is capable of scanning the beam vertically over a scan angle of about 16 degrees. Preferably, the reflective or light sensitive medium is located such that this total scan angle, with the horizontal scanning, produces a 945 line laser image raster with a film width of about 105 mm. The image size is controlled by varying the location of a 16 mm. lens 124 between the scanner 100 and the film camera C at a location at which the desired image size is obtained.

Figures 5, 7A, 7B:
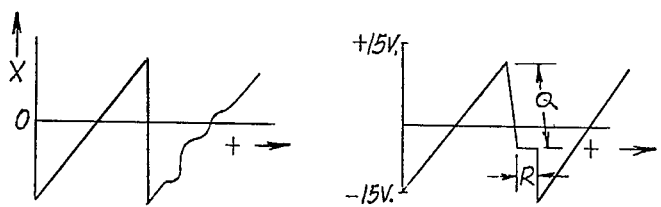
FIG. 5 is a diagrammatic view of a portion of the system shown in FIG. 2.
FIG. 7a and 7b are graphical views showing the operation of the system portion shown in FIG. 6.

The galvanometer scanner 100 is diagrammatically shown in FIG. 5. The scanner 100 includes a shaft 134 rotatably mounted on a housing 135 by a set of bearings 136. A reflective element 138 (preferably a low-mass mirror) is attached to one end of the shaft for rotation therewith. A spring member (not shown) biases the shaft 134 toward a predetermined center of rotation. The mirror 138 is thus mounted for rotational movement in the directions indicated by the arrows in FIG. 5, biased towards a predetermined rotational position. In practice, the axis of the shaft 134 lies in a vertical plane.

An armature 140 is mounted on the shaft. An electrical coil 142 is inductively coupled to the armature 140, such that when electrical current flows through the coil 142 a force is exerted on the armature 140 tending to rotate the shaft 134 and the mirror 138. The direction of the rotational force generated on the armature 140 is a function of the direction of current flow through the coil 142. When current flows in a first direction through the coil 142, the mirror 138 is rotationally deflected in a first direction from its centrally biased position and is deflected in the opposite direction when current flows in the opposite direction through the coil 142. The coil 142 is provided with electrical terminals through which current can be applied to the coil. The scanner 100 is suitably embodied by a Model G115 Galvanometer Scanner, manufactured by General Scanning Incorporated, of Waterloo, Mass.

The terminals of the coil 142 are connected to a control circuit 150 for actuating the coil 142 to cause the mirror 138 to scan over a predetermined excursion of rotational movement through the central position. The scanning is in synchronism with the vertical synchronization (drive) signals from the television camera 20, to synchronize the scanning by the mirror 138 with the field of scan rate of the television camera. This rate preferably causes the scanning cycle to be executed with a period of approximately 33 milliseconds.

Figure 6:
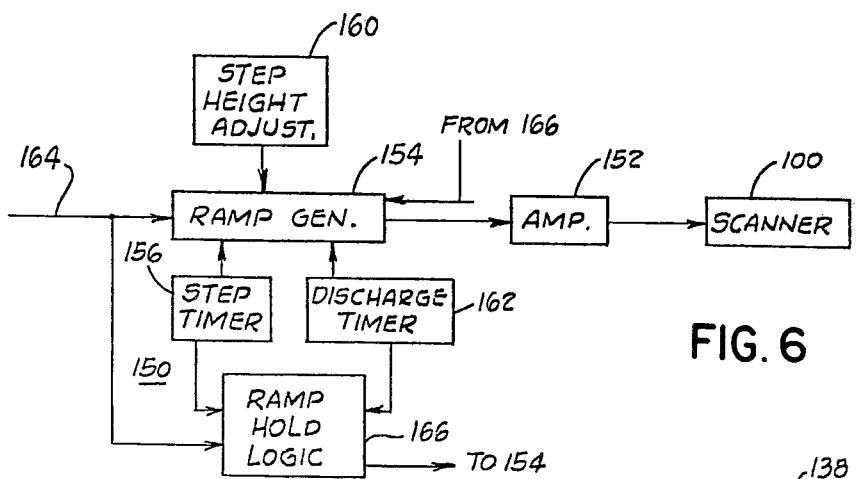
FIG. 6 is a block diagram of a portion of the system shown in FIG. 2.

The scanner control circuit 150 is illustrated in block form in FIG. 6. The circuit 150 generates a ramp function of current through the coil 142 to sweep the mirror through its scan excursion. The ramp ranges from a low of approximately −15 volts to a high of approximately +15 volts. Following the completion of each ramp generation, the signal on the coil 142 retraces from the +15-volt value to the −15-volt value very rapidly, i.e., in approximately two milliseconds. Following retrace, the ramp generation cycle can begin anew, or the ramp generation can be terminated after one cycle.

One difficulty in the use of scanners such as the galvanometer scanner 100 is the generation of undesirable harmonic oscillations of its rotatable components at the end of rapid movement, such as is required in the retrace operation. This is manifested by a mechanical vibration or oscillation of the mirror, armature and shaft which occurs when the mirror reaches the end of its excursion at the conclusion of the retrace movement.

This phenomenon is illustrated graphically in FIG. 7a. FIG. 7a is a simplified plot of the mechanical rotational motion of the mirror 138 of the scanner 100 with respect to time. As shown in FIG. 7a, the mirror moves relatively smoothly through its ramp sweep function, and then very rapidly returns to the opposite end of its excursion during retrace. Following retrace, a harmonic oscillation of the mirror takes place, shown by the undulating line in FIG. 7a after the retrace. Although this harmonic oscillation eventually dies out, its existence during a portion of the sweep motion adversely affects the performance of the scanner. It is therefore desirable to eliminate this harmonic oscillation insofar as it is possible.

For any given scanner, the physical parameters of its movable components establish a predetermined harmonic resonant frequency, at which the mechanical system tends to oscillate when its motion is abruptly changed, as, for example, the end of the retrace. In the particular galvanometer scanner 100 preferred in this application, this resonant frequency is about 850 Hz.

The control circuit 150 includes circuitry for generating the ramp (sweep) current function input to the coil 142 and for executing the retrace current function between each ramp function. The circuit 150 also includes circuitry for interrupting the retrace movement of the scanner at a predetermined level of the retrace cycle, and for a predetermined duration. The level, frequency and duration of this interruption are chosen such that the harmonic oscillations caused by the interruption are precisely equal in amplitude and opposite in phase to those induced by the arrival and change of direction of the mirror movement at its limit of excursion at the end of the retrace cycle.

This retrace interruption is graphically illustrated in FIG. 7b. FIG. 7b is a plot of the voltage impressed on the coil 142 with respect to time. As shown in FIG. 7b, during the ramp generation portion of the scanner operation cycle, the voltage in the coil varies linearly between −15 and +15 volts (during about 31 milliseconds), after which the retrace operation begins. According to the preferred embodiment, the retrace is interrupted, (the current in the coil 142 becomes constant), at a point at which the voltage on the coil is Q volts less than +15 volts. This interruption continues for a period of time indicated in FIG. 7b as R, after which the retrace resumes. Following completion of the retrace, a new ramp function is generated. The values Q and R are chosen such that harmonic oscillations induced in the movable component by the interruption of the retrace are equal in amplitude and opposite in phase to those induced by the discontinuity of motion at the end of the retrace cycle. As a result, the deliberately induced oscillations cancel out the others, so that the mirror moves smoothly and linearly with respect to time during the succeeding ramp sweep scanning motion.

The circuit 150 also includes circuitry for correcting for nonlinearity of the ramp function, by way of feedback applications.

The circuit 150 (FIG. 6) includes an amplifier section 152 for adjusting the magnitude and voltage midpoint of the ramp functions produced by the circuit 150. A ramp generator 154 produces the ramp functions and transmits them to the amplifier 152. A step timer 156 and a step height adjust element 160 combine, following the generation of each ramp function by the ramp generator 154, to establish the duration R and voltage value Q of the step interruption of the retrace portion of the ramp generation cycle. A discharge timer 162 operates to complete the retrace following the imposition of the step in the retrace function.

The ramp generator 154 generates each ramp function in response to the occurrence of each vertical drive pulse appearing on the lead 164. Ramp hold logic 166 is responsive to the step and discharge timers 156, 162 and to the vertical drive pulses, to stop the ramp generation operation and hold the voltage output from the generator 154 at a predetermined low level suitable for beginning a new ramp function, in the event that the succession of vertical drive pulses input to the ramp generator 154 is interrupted. Such a condition would arise when, for example, an examining physician would cause the television camera to execute only a single frame of scanning, and then cease its operation, and its production of vertical drive pulses. This would be done for the purpose of obtaining a "still" picture of radiation from a subject.

Figure 8:
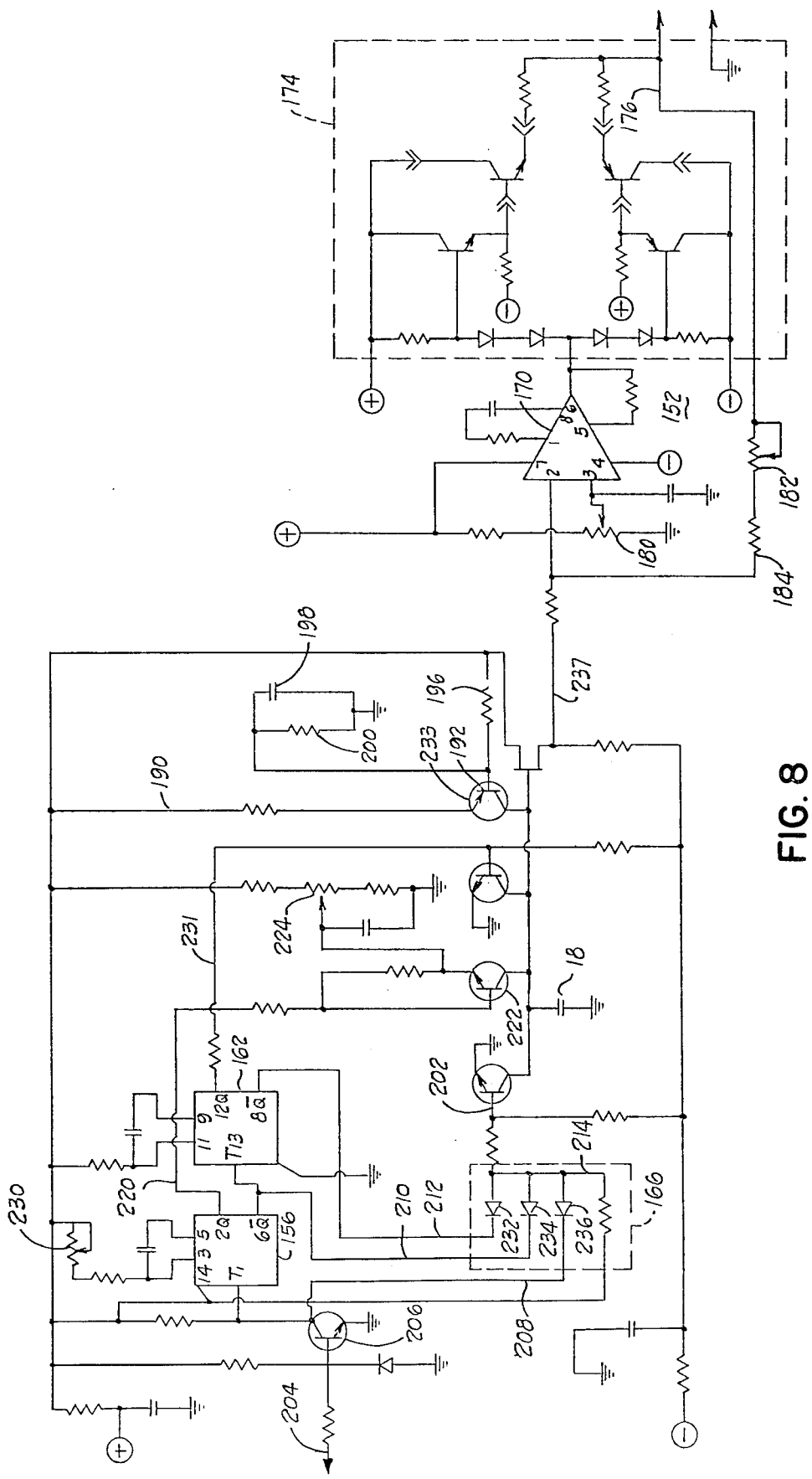
FIG. 8 is a schematic drawing of the portion of the system shown in FIG. 6.

The control circuit 150 is shown in schematic form in FIG. 8. The amplification section 152 includes an operational amplifier 170 which is connected to the scanner terminals by the transistor drive circuitry located within the dotted box generally designated as 174. The drive circuitry, in cooperation with the operational amplifier 170, amplifies ramp signals received from the ramp generator 154 to produce a ramp function having an excursion of generally between minus 15 and plus 15 volts at an output lead 176. Input circuitry connected to the operational amplifier 170 includes a potentiometer 180 for adjusting the center point, in terms of voltage, of the signal appearing at the output lead 176. Other circuitry connected to the operational amplifier inputs include a feedback loop extending between the lead 176 and including a potentiometer 182 and a limiting resistor 184. Adjustment of the potentiometer 182 governs the amplitude of the excursion of the ramp output voltage appearing at the lead 176 in response to the ramp functions generated by the ramp generator 154.

The loop extending between the lead 176 and the input to the operational amplifier 170 also carries feedback information to the amplifier input which tends to improve the linearity of the ramp functions output from the amplifier 170.

The ramp generator 154 includes a capacitor 186 which is charged by way of a lead 190 through a normally conductive transistor 192, held in that condition by voltage passing through a resistor 196, a capacitor 198, and a resistor 200. The capacitor 186 is normally charged so long as a low voltage is applied to the base of a transistor 202, holding it in its nonconductive state. When the transistor 202 is rendered conductive by the application of a relatively higher voltage to its base, the capacitor 186 discharges very rapidly.

Vertical drive pulses are applied to the circuit 150 from the television camera drive circuitry on a lead 204.

Each vertical drive pulse is a brief negative-going pulse, which is inverted to a positive-going pulse by a transitor 206. The succession of positive-going pulses representing the vertical drive signals appears on the lead 208. For reasons to be described later, the signals on the leads 210 and 212 are normally high.

The signal on the lead 214 in continuously relatively high. During the periods between the occurrence of vertical drive pulses, the signal on the lead 208 is low, maintaining a relatively low voltage on the base of the transistor 202, rendering it nonconductive, and allowing the accumulation of charge on the capacitor 186 in a ramp function. During the occurrence of a vertical drive pulse, the signal on the lead 208 becomes relatively high, raising the voltage on the base of the transistor 202, causing it to discharge the capacitor 186, effecting retrace of the ramp function.

The occurrence of the leading edge of a vertical drive pulse causes the step width timer 156 (a timed flip-flop) to produce a relatively high signal on a lead 220 for a predetermined time of between 340 microseconds and 640 microseconds, preferably for about 500 microseconds. This timed pulse, for its duration, causes a transistor 222 to become conductive, allowing the charge on the capacitor 186 to drain off through circuitry including a potentiometer 224, until a voltage level is reached on the capacitor 186 which is a function of the setting of the potentiometer 224. It is to be understood that, when the transistor 222 becomes conductive, which is at the maximum point of the ramp function, the voltage on the capacitor 186 drops almost instantaneously to the level determined by the setting of the potentiometer 224. The voltage on the capacitor 186 then remains at that preset level until the step timer 156 times out, and the signal on the lead 220 becomes relatively low again. The setting of the potentiometer 224 represents the step height adjustment 160. Preferably, the potentiometer 224 is set such that the level of the step in the retrace is about 5 percent greater than the voltage midpoint of the ramp.

The step width timer 156 also includes a potentiometer 230. Adjustment of the potentiometer 230 determines the duration of the high signal on the lead 220, ranging from 340 to 640 microseconds, preferably 500 microseconds.

Upon the timing out of the step timer 156, the discharge timer 162 is immediately actuated to time out, placing a relatively high signal on a lead 231 for a predetermined time of approximately high signal on a lead 231 for a predetermined time of approximately 100 microseconds. This signal renders a transistor 233 conductive, completing the discharge of the capacitor 186 following the step function generated by the step timer 156.

The output from the ramp generator 154 is represented as a signal input to a field effect transistor 235, governing the output which is impressed upon a lead 237, connect to the input of the operational amplifier 170, whose operation is as described above in response to these signals.

Ramp hold logic is provided to stop the generation of ramp signals in the absence of a continuing stream of vertical drive pulses, and to cause the capacitor 186 to return to its uncharged state, in readiness for generation of another ramp in response to the occurrence of a new vertical drive pulse when it occurs. This circuitry includes the diodes 232, 234, 236. The diode 234 is connected to the step timer 156 to receive a signal which is the inverse to that appearing on the lead 220. The diode 232 is connected to the discharge timer 162 to receive a signal which is the inverse of that appearing on the lead 231. Thus, the signals on the leads 210 and 212 are normally high, except when their respective timing circuits are timing out for brief periods in response to the occurrence of each vertical drive pulse. The diode 236 is connected to the collector of the transistor 206, and the signal on that diode, in the preferred system, is high in the absence of the occurrence of vertical drive pulses. This signal is high by virtue of other circuitry (not shown) which is responsive to actuation by an examining physician or technician to maintain the signal on the diode 236 at a high level in response to actuation of a foot switch, when only a single frame of exposure is desired, and it is not desired to produce a succession of vertical drive and ramp signals.

Under these circumstances, the transistor 202 remains nonconductive, allowing the generation of a ramp, during the period of approximately 33 millisecond following the initiation of the last vertical drive pulse. After the step timer 156 and discharge timer 162 have both timed out during retrace, and the capacitor 186 is discharged completely, the signals on the leads 210 and 212 are high, along with the signal on the lead 208. This condition causes a relatively high signal to be applied to the base of the transistor 202, rendering it conductive, and preventing any charge buildup on the capacitor 186 during the time when the generation of vertical drive pulses is prevented, and the signal on the lead 208 remains constantly high.

In this way, when the examining attendant actuates the circuitry for halting the generation of vertical drive pulses and rendering the signal on the lead 208 constantly high, the capacitor 186 remains in a no-charge condition, so that it is ready to begin the generation of a new ramp function upon the occurrence of the next vertical drive pulse in the indeterminate future, when the attendant permits it to be generated.

A photographic camera C is positioned to hold a portion of any suitable type of light sensitive film to view the laser beam image to record the highly resolved image described by this laser light. Such a camera is preferably a 105 millimeter (film width) camera Model 6543, manufactured by Picker Corporation, Cleveland, Ohio. The camera C can also be a motion picture or "cine" camera such as a Model 3662 camera, manufactured by Picker Corporation.

The laser beam recorder of this invention is thus capable of rendering a substantially continuous laser beam image of the image viewed by the television camera. This image being produced at a rate of up to 30 frames per second, the television scan rate. Optionally, appropriate controls of known type can be employed to operate the television camera for only one frame at a time in order to make "still" photographs of the laser image having a duration of approximately 1/30th of a second.

The laser light image produced by this system is susceptible of enhancement by so-called "apodization" techniques. Spatially incoherent (nonlaser) light is not as conveniently susceptible to these techniques. Apodization includes interposition of light-absorptive and/or phaseretarding (such as glass) elements in portions of the laser beam, to improve and make more useful the characteristics of the beam, by altering its frequency response. Among the improvements obtainable by spatial filtering are contrast enhancement of the laser beam image, emphasis of coarse or fine detail (by manipulation of low and high frequency response, respectively) and the reduction of the visibility of the raster lines of the image (by altering response in the frequency range corresponding to the spacing between raster lines). Preferably, the absorptive and phase-shifting elements 130 (FIG. 2) are interposed in the laser beam between the deflector 70 and the beam reducing assembly 90, when the beam is relatively large (about 25 mm.) and the elements can be more easily disposed.

Some specific means and criteria for implementing apodization are explained in the *Journal of the Optical Society of America,* September, 1973, Vol. 63, p. 1071, et seq., which publication is hereby expressly incorporated by reference.

The description of this preferred embodiment of this invention is intended as illustrative rather than exhaustive. It is to be recognized that persons of ordinary skill may make certain modifications, additions or changes to this specific embodiment without departing from the spirit and the scope of the invention as described herein and in the appended claims.

What is claimed is:

1. A control circuit for an optical deflector having a movable beam-directing element and an input circuit for moving the beam-deflecting element as a function of an electrical potential applied to the input circuit, the control circuit comprising:
    (a) a generator for impressing a voltage waveform on the input circuit having a portion inducing sweep motion and a portion inducing retrace motion of the beam directing element; and,
    (b) circuitry for causing an abrupt variation in the retrace waveform portion to compensate for harmonic vibrations in the retrace motion caused by a transition between the sweep and retrace motion.

2. The circuit of claim 1, wherein:
the abrupt variation comprises a stepped portion in the retrace waveform.

3. The circuit of claim 2, wherein:
the duration and level of the stepped portion are selected to induce harmonic vibrations in the beam-directing element movement which are substantially equal in amplitude and opposite in phase to those oscillations induced by the transition between sweep and retrace movement.

4. The circuit of claim 2, wherein the stepped portion is produced by circuitry comprising:
    (a) a circuit producing a step signal having a magnitude lying between the extreme values of the sweep waveform portion; and,
    (b) a step timer for controlling the time duration of the step signal.

5. The circuit of claim 4, further comprising:
step height circuitry for adjusting the magnitude of the step signal.

6. The circuit of claim 4, further comprising:
circuitry for adjusting the predetermined step time duration.

7. The circuit of claim 1, further comprising:
circuitry for adjusting the extreme values of the sweep waveform portion.

8. The circuit of claim 1, wherein:
the sweep waveform portion has an equal excursion from ground potential in both positive and negative directions.

9. The circuit of claim 8, wherein:
the step portion has a duration lying in the approximate range of from 0.5 to 1 millisecond, and level in the approximate range between ground potential and approximately 60% of the positive excursion of the sweep waveform portion.

10. A method for controlling an optical deflector having a movable reflector and an input circuit for moving the reflector as a function of electrical potential applied to the input circuit, comprising the steps of:
(a) producing a voltage waveform for impression upon the input circuit having a reflector sweep inducing portion and a reflector retrace inducing portion; and,
(b) causing an abrupt variation in the retrace waveform portion to compensate for harmonic vibrations in the reflector motion caused by a subsequent transition between reflector sweep and retrace motion.

11. The method of claim 10, wherein the step of causing an abrupt variation comprises including a stepped portion in the retrace waveform portion.

12. The method of claim 11, wherein:
the duration and voltage level of the stepped portion are preselected to induce harmonic vibrations in the reflector movement which are substantially equal in amplitude and opposite in phase to those oscillations induced by the subsequent transition between reflector sweep and retrace motion.

13. The method of claim 11, wherein the step of impressing the stepped portion comprises the steps of:
(a) producing a step signal having a magnitude lying between the extreme values of the sweep waveform portion; and,
(b) selectively controlling the impression of the voltage waveform and the step signal to the input circuit by impressing the step signal on the input circuit for only a predetermined step width duration following the initiation of the retrace waveform portion.

14. The method of claim 11, further comprising the step of:
adjusting the magnitude of the level of the stepped portion.

15. The method of claim 11, further comprising the step of:
adjusting the width of the stepped portion.

16. The method of claim 10, further comprising the step of:
adjusting the extreme values of the sweep waveform portion.

17. The method of claim 10, wherein:
(a) the step of producing the voltage waveform comprises producing the voltage waveform with an equal positive and negative excursion from ground potential; and,
(b) the stepped portion has a duration of approximately 0.5 to 1 millisecond, and a level of between approximately ground potential and 60% of the negative excursion of the voltage waveform.

18. A control circuit for an optical deflector having a movable beam deflecing element and being responsive to position the deflecting element as a function of the value of an electrical signal applied to the deflector, the circuit comprising:
(a) a generator for impressing an electrical sweep waveform on the deflector approximating a linear ramp function; and,
(b) feedback control circuitry for improving the linear approximation of the ramp function.

19. The control circuit of claim 18, wherein:
(a) the control circuit further comprises an output amplifier for transmitting the electrical sweep waveform between the generator and the deflector; and,
(b) the feedback control circuitry comprises:
(i) an element connected to sample the the electrical voltage applied to the deflector; and,
(ii) a feedback amplifier for transmitting a signal which is a function of the sampled voltage from the current sampling element to an input of the output amplifier.

20. The circuit of claim 19, wherein:
(a) the deflector comprises an input circuit connected to receive the electrical sweep waveform and responsive thereto for inducing motion of the reflector; and,
(b) the voltage sampling element comprises a resistor connected across a portion of the input circuit.

21. A method for controlling the operation of an optical deflector having a movable beam-deflecting element and being responsive to position the beam-deflecting element, as a function of the value of an electrical signal applied to the deflector, the method comprising the steps of:
(a) impressing an electrical sweep waveform on the deflector to move the beam-deflecting element, the electrical sweep waveform approximating a linear ramp function; and,
(b) applying a feedback control signal for improving the linear approximation of the ramp function.

22. The method of claim 21, wherein:
(a) the method comprises the additional step of amplifying the electrical sweep waveform prior to its impression upon the deflector; and,
(b) the step of applying a feedback signal comprises:
(i) sampling the amount of current and voltage applied to the deflector; and,
(ii) producing a feedback signal which is a function of the sampled current and voltage and applying the feedback signal to an input of an amplifier utilized in amplifying the electrical signal waveform.

23. A control circuit for operating an optical deflector having a movable beam-directing member and being responsive to move the beam-directing member as a function of an electrical signal applied to the deflector, the control circuit comprising:
a generator responsive to the coincidence of one of a succession of drive pulses and an effect of a second signal to produce an electrical signal wave to move the beam-n directing element in a predetermined fashion.

24. The circuit of claim 23, wherein said second signal represents the occurrence of a mechanical event.

25. A method for operating an optical deflector having a movable beam-directing member and being responsive to move the beam-directing member as a function of an electrical signal applied to the deflector, the method comprising the step of:
producing an electrical signal wave to move the beam-directing element in a predetermined fashion in response to the coincidence of one of a succession of drive pulses and an effect of a second signal.

26. The method of claim 25, wherein said second signal represents the occurrence of a mechanical event.

* * * * *